(12) United States Patent
Qiu et al.

(10) Patent No.: US 10,230,641 B2
(45) Date of Patent: *Mar. 12, 2019

(54) METHOD AND APPARATUS FOR CONTROLLING CALL VOLUME

(71) Applicant: AT&T Intellectual Property I, L.P., Atlanta, GA (US)

(72) Inventors: Chaoxin Qiu, Austin, TX (US); Robert F. Dailey, Austin, TX (US); Arshad Khan, Austin, TX (US); Satish Parolkar, Austin, TX (US); Jeffrey L. Scruggs, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,144

(22) Filed: Apr. 23, 2018

(65) Prior Publication Data

US 2018/0241676 A1 Aug. 23, 2018

Related U.S. Application Data

(63) Continuation of application No. 14/709,042, filed on May 11, 2015, now Pat. No. 9,954,780, which is a continuation of application No. 12/189,648, filed on Aug. 11, 2008, now Pat. No. 9,031,217.

(51) Int. Cl.
*H04L 12/801* (2013.01)
*H04M 9/08* (2006.01)
*H04M 7/00* (2006.01)

(52) U.S. Cl.
CPC .......... *H04L 47/12* (2013.01); *H04M 7/0081* (2013.01); *H04M 9/08* (2013.01)

(58) Field of Classification Search
CPC ...... H04M 3/2281; H04M 3/54; H04M 7/128; H04M 15/47; H04M 2215/0148; H04M 1/66; H04M 3/58; H04M 7/00; H04M 7/009; H04L 47/12
USPC ..... 379/111–114.09, 210.02, 210.03, 221.03, 379/221.04, 201.02; 455/453; 370/352
See application file for complete search history.

(56) References Cited

U.S. PATENT DOCUMENTS

| | | | |
|---|---|---|---|
| 6,021,126 A * | 2/2000 | White | H04M 3/4228 370/352 |
| 6,298,123 B1 | 10/2001 | Nolting et al. | |
| 7,783,294 B2 * | 8/2010 | Batni | G06F 9/445 455/453 |
| 9,031,217 B2 | 5/2015 | Qui et al. | |
| 2001/0012345 A1 | 8/2001 | Nolting et al. | |
| 2008/0004019 A1 | 1/2008 | Grilli et al. | |

* cited by examiner

*Primary Examiner* — Md S Elahee

(57) ABSTRACT

A method and apparatus for controlling a call volume for an office that serves as a protecting site for another office in a packet network are disclosed. For example, the method collects one or more customer registration counts from one or more session border controllers located in a first office, determines if the one or more customer registration counts have reached or exceeded a threshold. The method directs all of said one or more session border controllers located in said first office to enact one or more throttling rules if the one or more customer registration counts have reached or exceeded the threshold.

20 Claims, 5 Drawing Sheets

METHOD AND APPARATUS FOR CONTROLLING CALL VOLUME

This application is a continuation of U.S. patent application Ser. No. 14/709,042, filed May 11, 2015, now U.S. Pat. No. 9,954,780, which is a continuation of U.S. patent application Ser. No. 12/189,648, filed Aug. 11, 2008, now U.S. Pat. No. 9,031,217, which are herein incorporated by reference in their entirety.

The present invention relates generally to communication networks and, more particularly, to a method for controlling call volume for an office, e.g., for an access office, that serves as a protecting site for another office in a packet network, e.g., an Internet Protocol (IP) network or Voice over Internet Protocol (VoIP) network.

BACKGROUND OF THE INVENTION

A large scale service provider network, e.g., a Next Generation Network (NGN), may comprise multiple regional access offices connected to a backbone network, e.g., an Internet Protocol (IP) backbone network. The service provider may enable an access office to serve as a protection site for another access office. For example, if a network failure affects the ability to reach a first access office, the service provider may enable a second access office to serve as a protection site such that customers who typically register at the first access office may utilize the second access office in the event of a failure. However, the majority of calls (outbound and inbound) for the customers who re-register at a protection site are for a customer phone number served by the first access office. For example, the majority of calls between re-registered (re-homed) customers and Public Switched Telephone Network (PSTN) phone numbers are served by media gateways in the first access office. Hence, the majority of voice media packets for calls for the re-homed customers associated with PSTN phone numbers will traverse links between one or more access offices and the backbone network multiple times. In other words, the re-homed customers will use the second access office to reach the first access office. This increase in traversals due to the re-homing of a portion of the customers for the service provider consumes a significant capacity of the network.

In some failure scenarios, e.g., failure of all public connections to a first access office, a large number of customers may be affected. If a large number of customers re-register at one or more session border controllers located at the protection site for the access office, the majority of calls for the re-homed customers for PSTN phone numbers may still need to use media gateways in the first access office. Thus, a massive number of customers re-registering at the protection site may result in the network being overloaded and performance being degraded for all calls.

SUMMARY OF THE INVENTION

In one embodiment, the present invention discloses a method and apparatus for controlling a call volume for an office that serves as a protecting site for another office in a packet network. For example, the method collects one or more customer registration counts from one or more session border controllers located in a first office, determines if the one or more customer registration counts have reached or exceeded a threshold. The method directs all of said one or more session border controllers located in said first office to enact one or more throttling rules if the one or more customer registration counts have reached or exceeded the threshold.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for controlling call volume for an office, e.g., an access office, that serves as a protecting site for another office. Although the present invention is discussed below in the context of an IP Multimedia Subsystem (IMS) network, the present invention is not so limited. Namely, the present invention can be applied to all networks capable of supporting Voice over Internet Protocol (VoIP) and the like.

Figure 1:
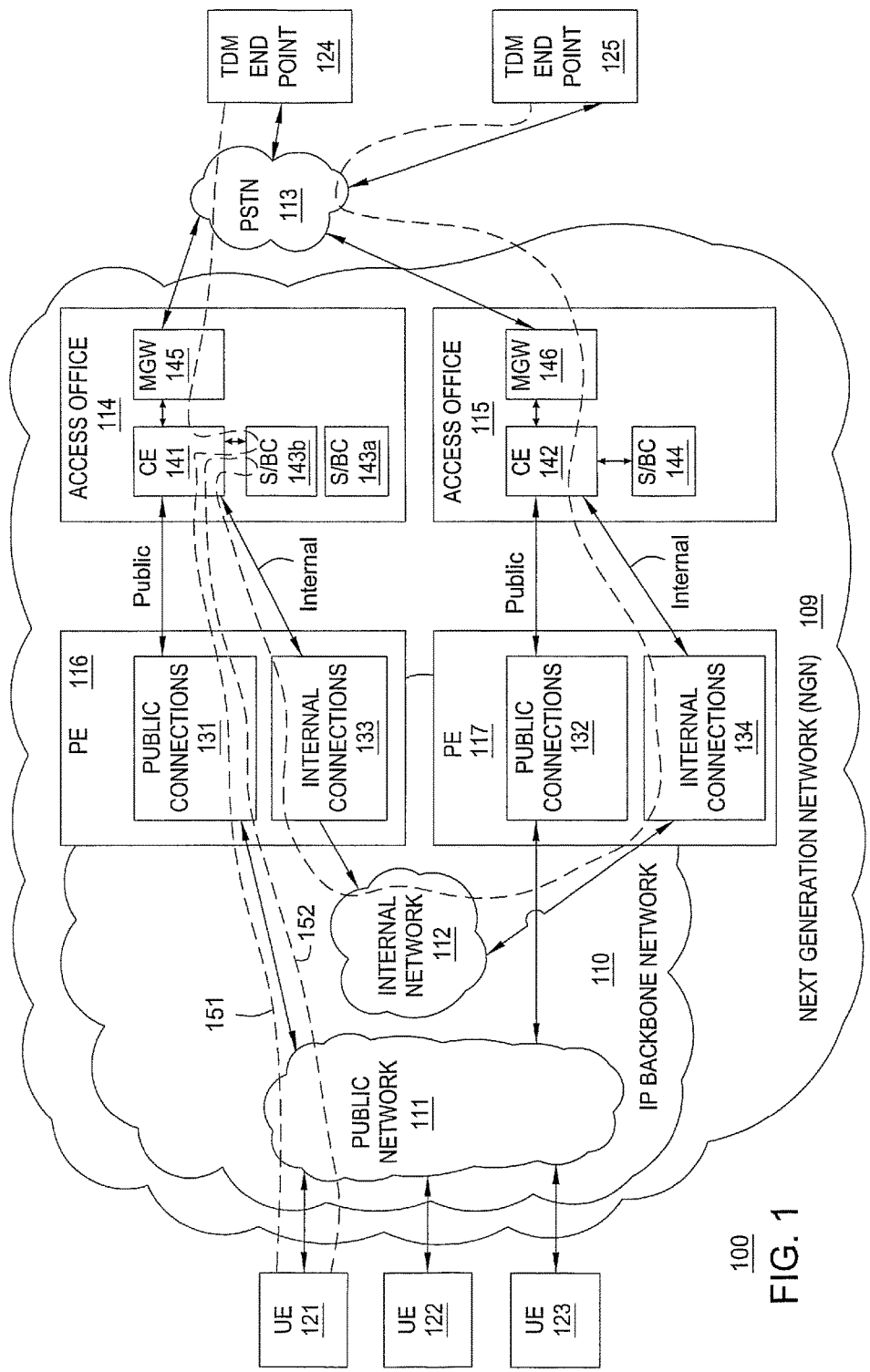
FIG. 1 illustrates an exemplary network related to the present invention.

FIG. 1 illustrates an exemplary network 100 related to the current invention. The exemplary network 100 may be used to support calls between Internet Protocol (IP) based and Time Division Multiplexing (TDM) based customer endpoint devices. For example, the illustrative network 100 may comprise IP based User Endpoint (UEs) 121-123 connected to a carrier (e.g., a service provider) Next Generation Network (NGN) to access services, e.g., VoIP services and the like. For example, the network 100 may be used to support a call between an IP based UE 121, 122 or 123 and a TDM based Public Switched Telephone Network (PSTN) endpoint 124.

In one embodiment, the NGN includes regional access offices 114 and 115 connected to the IP backbone network 110. The IP backbone network 110 may comprise a public network 111 and an internal network 112. Network addresses (e.g. router addresses) within the internal network 112 are reachable using routing information available only within the service provider's network. The public network 111 comprises the network portion reachable using routing information (e.g. IP addresses) available in public domain.

The IP backbone network 110 also comprises Provider Edge (PE) routers 116 and 117. The PE routers 116 and 117 may provide routing for both the public and internal networks 111 and 112. Specifically, PE router 116 is logically segmented into a portion for supporting public connections 131 and a portion for supporting internal connections 133. Similarly, PE router 117 is logically segmented into a portion supporting for public connections 132 and a portion for supporting internal connections 134. To simplify the present disclosure, the portion for supporting public connections and the portion for supporting internal connections will be referred to as simply public connections and internal connections.

In one embodiment, regional access offices 114 and 115 are used for hosting one or more network devices such as Session Border Controllers (S/BC), Media Gateways (MGWs), Customer Edge (CE) routers, and the like in a distributed manner. Note that an access office may host any number of media gateways, any number of S/BCs, etc. In addition, the number and type of devices hosted at each access office may be different.

In one embodiment, the Session Border Controllers (S/BCs) are used to enable IP UEs to connect to the NGN 109 for obtaining services. For example, a UE may register at a particular S/BC to receive VoIP services. Each S/BC bridges between the public network 111 and the internal network 112. Once a UE registers at a particular S/BC, calls to/from the UE flow through that particular S/BC at which the UE is registered. The particular S/BC will then perform the bridging of the call between the public and internal networks for the registered UE.

In one embodiment, the MGWs are used to support calls between the IP based UEs and TDM based PSTN endpoints. For example, calls to or from a PTSN phone use a particular trunk group on a particular MGW, depending on the PSTN number. The PSTN number refers to a phone number. For example, in phone numbers derived from the North American Numbering Plan (NANP), the phone number is a 10 digit number. The area code is the first three digits, and is also referred to as a Numbering Plan Area (NPA) code. The term NPA.NXX refers to the first six digits of a phone number containing the NPA code and a three digit exchange number following the area code. Calls to and from a particular NPA.NXX may then use a particular trunk group on a particular MGW. For example, MGW 146 may handle calls to/from the PSTN phone 124.

In network 100, regional access office 114 hosts CE router 141, session border controllers 143*a* and 143*b* and media gateway 145. Similarly, regional access office 115 hosts CE router 142, session border controller 144 and media gateway 146. Each regional access office 114 or 115 is connected to the IP backbone network 110 via a PE router, e.g., PE 116 or 117, over both public and internal connections. Namely, CE router 141 is connected to the public connections 131 on PE router 116 over a public link, e.g., over the Internet. CE router 141 is also connected to the internal connections 133 on PE router 116 over an internal link, e.g., an internal local area network. Similarly, CE router 142 is connected to the public connections 132 and internal connections 134 on PE router 117.

Packets from IP UEs 121-123 reach an access office 114 or 115 via the public network 111 and a public connection on either PE 116 or 117. For example, UE 121 may register at S/BC 143*b* in access office 114. Packets from UE 121 may then reach the S/BC 143*b* in access office 114 via the public network 111, the public connections 131 located in PE 116 and CE 141. Similarly, UE 123 may register at S/BC 144 in access office 115. Packets from UE 123 may then reach the S/BC 144 in access office 115 via the public network 111, the public connections 132 located in PE 117 and CE 142.

If a call is between an IP based UE and a TDM based PSTN phone, the call is handled by the S/BC at which the UE is registered and the MGW handling calls to/from the PSTN phone number for the specific area code, i.e. NPA code. If the S/BC and the MGW for a call are collocated in the same access office, the call traverses the link between the PE router and the CE router once. If the S/BC and the MGW for a call are located in different access offices, the call traverses the link between the PE router and CE router in the access office with the S/BC twice and the link between the PE router and CE router in the access office with the MGW once.

In one example, a call is originated by UE 121 registered at S/BC 143*b*. The call is destined to a PSTN phone 124 and MGW 145 handles the area code (NPA) for the PSTN endpoint 124. A call path 151 illustrates the path traversed by packets between UE 121 and PSTN endpoint 124. For example, the call originated by UE 121 traverses PE 116 and CE 141 to reach S/BC 143*b*. S/BC 143*b* bridges the call to the internal network and forwards the call to MGW 145 via CE 141. The MGW 145 may then forward the call to the PSTN endpoint 124 via the PSTN 113.

In one example, a call is originated by UE 121 registered at S/BC 143*b*. The call is destined to a PSTN endpoint 125 and MGW 146 handles the area code (NPA) for the PSTN endpoint 125. A call path 152 illustrates the path traversed by packets to/from UE 121 from/to PSTN phone 125. The call originated by UE 121 traverses PE 116 and CE 141 to reach S/BC 143*b*. S/BC 143*b* bridges the call to the internal network and forwards the call to MGW 146 via CE 141, PE 116 (internal connections 133), internal network 112, PE 117 (internal connections 134) and CE 142. The MGW 146 may then forward the call to the PSTN endpoint 125 via the PSTN 113.

As illustrated in the above example, when the S/BC and MGW for a call are in different access offices, twice as much bandwidth is required in the access office with the S/BC, as compared to the bandwidth required for an access office where both the S/BC and MGW are collocated. General phone call statistics shows that the majority of phone calls are local calls. Accordingly, network service providers may design their access offices placing S/BCs and MGWs such that the majority of calls between IP based UEs and TDM based PSTN endpoints traverse collocated S/BCs and MGWs. However, the network may be designed to handle a specific fraction of calls traversing an S/BC and an MGW in different access offices. For example, the network may be engineered to handle approximately 10% of calls traversing an S/BC and an MGW in different access offices.

If a UE is unable to register or it loses connectivity to the S/BC that normally services it, the UE may register at another S/BC and continue accessing services. The re-registering at another S/BC may also be referred to as re-homing. Note that the MGW is connected via the internal network. The re-homed UEs may continue originating and receiving calls to/from the PSTN phone numbers using the MGW in one access office, but another S/BC in a different access office. For example, if the UE was typically calling PSTN phone numbers with area code 212 and the MGW handling the area code 212 was located in a first access office as the S/BC at which the UE was originally registered, after re-homing by registering at another S/BC located at a second access office, the UE's calls to area code 212 will be handled by the S/BC located at the second office and the MGW in the first office. That is, the majority of calls to/from re-homed UEs will flow via an S/BC and an MGW in different access offices.

In one embodiment, a service provider may enable an access office to serve as a protection site for another access office. For example, if a network failure affects access to a first access office, the service provider may enable a second access office to serve as a protection site such that customers who typically use the first access office may utilize the second access office. However, in some failure scenarios, the public network connection to an access office may be affected by a failure while the internal portion is functioning normally. A large number of UEs may then re-home to a protection site (another access office) resulting in a massive re-homing event. A massive re-homing event refers to a network event in which a pre-determined large number or percentage of UEs registered at one or more S/BCs in a first access office re-register at one or more S/BCs located at another access office (e.g., a second access office) serving as a protection site for the first access office.

As discussed above, the majority of PSTN calls to/from the re-homed UEs is for an area code that is serviced by a MGW in the first access office. Since these calls require more network bandwidth as explained above, a massive re-homing event may result in the network being overloaded, performance being degraded, etc. for all calls. For example, calls that are normally handled by the protection site may experience increased delay, packet loss, and the like, due to the increased number of calls resulting from the massive re-homing event.

In one embodiment, the current invention provides a method for controlling call volume for an access office that serves as a protection site for another access office. The method first provides a site monitor at each access office. The site monitor stores a list of NPA codes that are handled by MGWs within the same access office. The site monitor also notifies all S/BCs in the same access office of the list of NPA codes that are handled by MGWs within the same access office. If there is a change to the list, the site monitor provides updates to the S/BCs accordingly.

In one embodiment, the site monitor also comprises a rule-engine for throttling calls. Throttling refers to controlling the number of calls allowed between UEs and the PSTN network, other than calls to/from PSTNs phones with an NPA code served by an MGW located in the same access office as the S/BC at which the UE is registered. For example, if a massive fail-over for a first access office occurs, the rule-engine in a second access office may decide to throttle calls between re-homed UEs and PSTN networks such that the number of calls that have to use MGWs in the first access office is controlled. This approach will minimize the impact to UEs that are re-homed with the second access network.

In one embodiment, the service provider may populate one or more throttling parameters in a site monitor. For example, the service provider may determine the number of calls (e.g., re-homed calls or inter-access office calls) that may be allowed at any given time, the number of calls that may be allowed in a sliding window of time, and so on. If the service provider creates or modifies a rule for throttling calls and/or throttling parameters, the site monitor may provide updates to the S/BCs located in the same access office.

In one embodiment, the service provider determines the rules for throttling and/or populates the one or more throttling parameters based on the number of inter-access office calls the network can support. For example, if it is expected that 95% of the total number of calls being local calls, the network may be designed with sufficient bandwidth to handle 100% of the total number of calls being local and with sufficient bandwidth to handle 15% of the total number of calls being to or from other access offices. The throttling rules may be set to limit inter access office calls to 15% for an access office. Furthermore, another rule may then limit calls to/from re-homed UEs to PSTNs served in other locations to 10%. It should be noted that these threshold values are only illustrative and the present invention is not limited to a particular threshold value.

In one embodiment, the site monitor will collect customer registration counts from S/BCs located in the same access office, e.g., periodically in accordance with a schedule. For example, the site monitor may collect customer registration counts in a pre-determined interval, e.g., every 5 minutes, 15 minutes, and so on.

In one embodiment, the site monitor then aggregates the customer registration counts over time and tracks historical data for one or more pre-determined time windows. For example, the registration counts may be aggregated over a hourly sliding time window of time to track changes.

The site monitor may then detect when a massive fail-over for an access office occurs. For example, if a large number of UEs registered at a first access office re-register at the protection site for the first access office, then the method may identify or correlate the changes as a significant network event, e.g., a massive fail-over event. The site monitor in the protection access office will detect the sudden increase of registered user numbers and will determine that a massive failover has occurred.

If a site monitor detects a massive fail-over, e.g., when a predetermined threshold is reached or exceeded, the site monitor directs all S/BCs located in the same access office to enact throttling for PSTN calls other than those NPA codes currently being serviced by the MGW located in the same access office.

When throttling is enacted, an S/BC first determines if a call is between an internet protocol UE and a PSTN endpoint. For example, the S/BC may use the Session Description Protocol (SDP) data in the Session Initiation Protocol (SIP) of the signaling message. If the call is between a UE and PSTN endpoint, the S/BC further checks to determine if the NPA code is supported by a MGW located in the same access office. If the call is not supported by a MGW located in the same access office, the S/BC then compares the throttling rules against the historical tracking data of similar calls. The S/BC may then either reject the call or allow the call to be setup. For example, if the tracking data indicates that the limits for simultaneous calls in accordance with the throttling rules have already been reached, then the call may be rejected. The S/BC may then update its local tracking counters for PSTN calls to/from other access offices.

Figure 2:
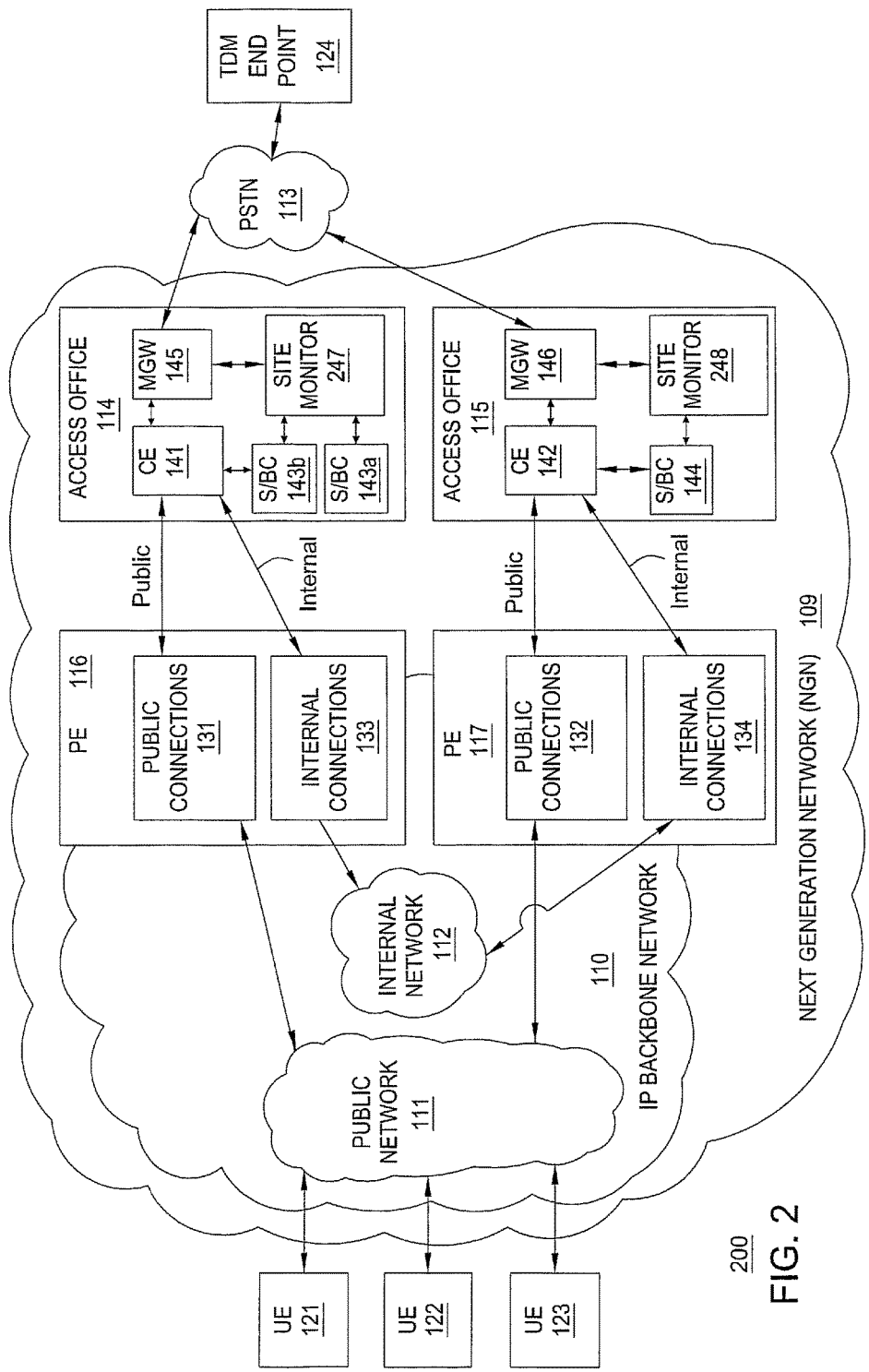
FIG. 2 illustrates an exemplary network with one embodiment of the present invention for controlling call volume for an office.

FIG. 2 illustrates an exemplary network 200 with one embodiment of the present invention for controlling a call volume for an access office that serves as a protection site for another access office. In one embodiment, the service provider implements site monitors 247 and 248 in access offices 114 and 115, respectively. The service provider also enables the access office 114 to serve as a protection site for access office 115.

The site monitor 114 stores a list of NPA codes that are handled by MGW 145. The site monitor 247 also notifies S/BCs 143*a* and 143*b* of the list of NPA codes that are handled by MGW 145. If there is a change to the list of NPA codes, the site monitor 247 will provide updates to the S/BCs 143*a* and 143*b* accordingly.

In one embodiment, the site monitor 247 may comprise a rule-engine for throttling calls between re-homed UEs and PSTN networks such that the number of calls that have to use MGWs in another access office is controlled. For example, the site monitor 247 collects customer registration counts from S/BCs 143*a* and 143*b* periodically. The site monitor then aggregates the customer registration counts over time and tracks historical data for one or more predetermined time windows. For example, the registration counts may be aggregated over a hourly sliding time window, and so on.

The site monitor 247 may then detect if a massive fail-over for access office 115 has occurred. For example, if a large number of UEs registered at access office 115 re-register at access office 114, the site monitor 247 will detect the massive fail-over events, e.g., detecting a significant increase in the numbers of re-homed calls. If the site monitor 247 detects a massive fail-over, then the site monitor will direct S/BCs 143a and 143b to enact throttling for PSTN calls other than to and from those NPA codes currently serviced by the MGW 145.

In one embodiment, the site monitor 247 may continue tracking the data being received from the S/BCs to determine if the number of re-homed UEs is back to normal historical levels. For example, the access office that had experienced the access failure may recover. In another embodiment, network operations personnel may issue a command manually to the site monitor 247 to disable the throttling of calls. If the condition for throttling calls is no longer applicable, the site monitor 247 may then disable the function of throttling calls.

When throttling is enacted, the S/BC 143a or 143b first determines if a call is between an internet protocol UE and a PSTN endpoint. For example, the S/BC 143b may determine that a call is between a UE and a PSTN endpoint. The S/BC 143b will also check to determine if the NPA code for the call is currently supported by a MGW 145. If the call is not supported by the MGW 145, the S/BC 143b then compares the throttling rules against the historical tracking data of similar calls. The S/BC 143b may then either reject the call or allow the call to be setup. For example, if the call is from UE 123 re-homed to S/BC 143b but the MGW being used is MGW 146 located in access office 115, then the tracking data is compared to the throttling rules. If the tracking data indicates that the limits for simultaneous calls in accordance with the throttling rules have already been reached for such calls, then the call will be rejected. The S/BC 143b may then update its local tracking counters for PSTN calls to/from other access offices.

Figure 3:
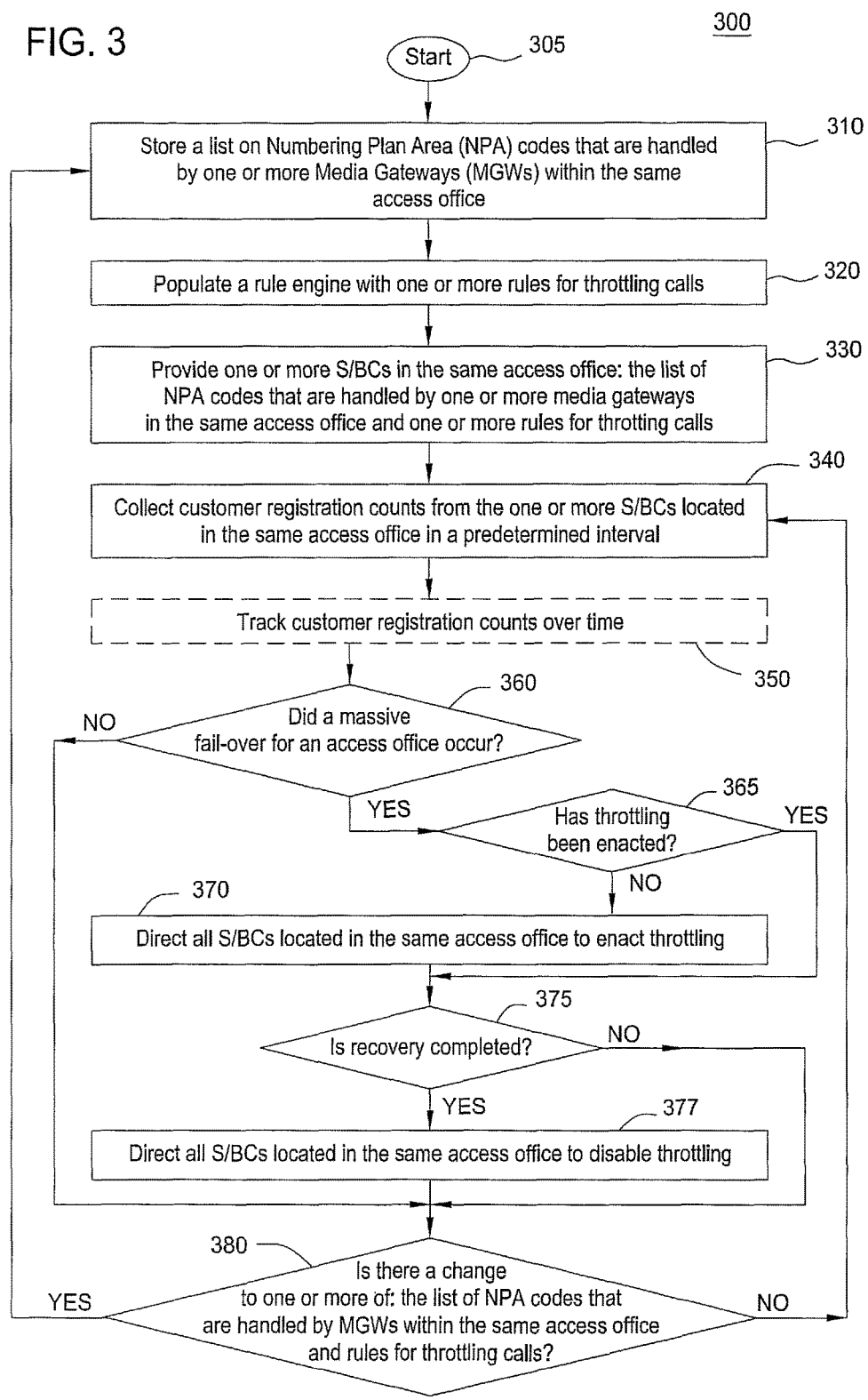
FIG. 3 illustrates a flowchart of a method for controlling call volume for an office that serves as a protecting site for another office.

FIG. 3 illustrates a flowchart of a method 300 for controlling call volume for an access office that serves as a protecting site for another access office. For example, one or more steps of method 300 can be implemented by a site monitor. Method 300 starts in step 305 and proceeds to step 310.

In step 310, method 300 stores a list of Numbering Plan Area (NPA) codes that are handled by one or more Media Gateways (MGWs) within the same access office. For example, the method may store a list of NPA codes that are using an MGW trunk within the same access office to reach a Public Switched Telephone Network (PSTN) phone number.

In step 320, method 300 populates a rule engine with one or more rules for throttling calls. For example, a rule-engine may have a rule for throttling calls that specifies that an S/BC throttles calls between re-homed UEs and PSTN networks such that the number of calls that have to use MGWs in the first access office experiencing an access failure is controlled to a specific predetermined number. For example, the rule may specify the number (e.g., a threshold value) of PSTN calls from re-homed UEs via MGWs in the first access office where call throttling will start, e.g., not to exceed a 1000 calls per hour, 1000 calls in any sliding time window of 1 hour, and so on.

In step 330, method 300 provides one or more Session Border Controllers (S/BCs) in the same access office: the list of NPA codes that are currently handled by one or more media gateways in the same access office and one or more rules for throttling calls.

In step 340, method 300 collects customer registration counts from the one or more S/BCs located in the same access office in a predetermined interval. For example, the site monitor may collect customer registration counts from counters in S/BCs every 5 minutes, 15 minutes, and so on.

In optional step 350, method 300 tracks customer registration counts over time. For example, the method may aggregate the customer registration counts over various time intervals and track historical data for pre-determined time windows. For example, the registration counts may be aggregated over a hourly sliding time window to track changes.

In step 360, method 300 determines whether a massive fail-over for an access office occurred from the customer registration counts, e.g., monitoring whether a threshold value has been reached or exceeded. For example, if a large number of customer UEs registered at a first access office re-register at the protection site for the first access office, then the method may identify or correlate the network event as a massive fail-over event for the first access office. In another example, if the number of customer registration counts changes by a predetermined percentage, e.g., 200%, the method may determine that a massive fail-over for an access office has occurred and so on. If the method determines that a massive fail-over for an access office has occurred, the method proceeds to step 365. Otherwise, the method proceeds to step 380.

In step 365, method 300 determines whether throttling has previously been enacted. If the query is positively answered, method 300 proceeds to step 375. Otherwise, method proceeds to step 370.

In step 370, method 300 directs all S/BCs located in the same access office to enact throttling. For example, the method may direct all S/BCs in the same access office such that the number of PSTN calls other than to and from those NPA codes currently being serviced by the MGW located in the same access office is controlled in accordance with the throttling rules.

In step 375, method 300 determines if recovery is completed. For example, the method may determine customer registration counts are back to normal historical levels. If recovery is completed, the method proceeds to step 377. Otherwise, the method proceeds to step 380.

In step 377, method 300 directs all S/BCs located in the same access office to disable throttling. For example, the method may disable throttling calls for an access office that has recovered. The method may then proceed to step 380.

In step 380, method 300 determines if there is a change to one or more of: the list of NPA codes that are handled by MGWs within the same access office and rules for throttling calls. If there is no change, the method proceeds to step 340. Otherwise, the method proceeds to step 310.

Figure 4:
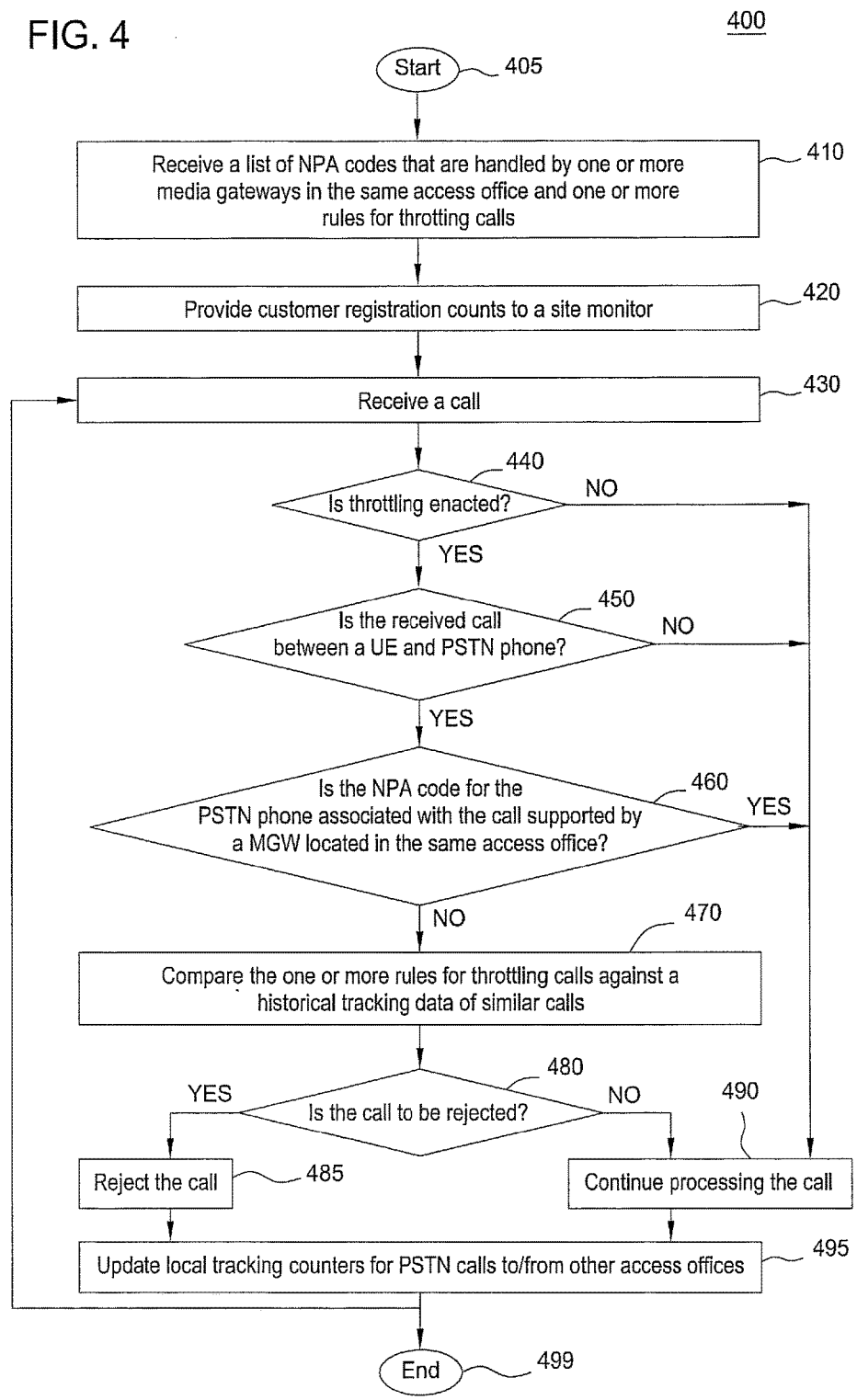
FIG. 4 illustrates a flowchart of a method for throttling calls.

FIG. 4 illustrates a flowchart of a method 400 for throttling calls. For example, one or more steps of method 400 can be implemented by a session border controller located in an access office that serves as a protecting site for another access office. Method 400 starts in step 405 and proceeds to step 410.

In step 410, method 400 receives a list of NPA codes that are handled by one or more media gateways in the same access office and one or more rules for throttling calls. For example, an S/BC receives a list of NPA codes that are handled by MGWs in the same access office as the S/BC and also receives rules for throttling calls.

In step 420, method 400 provides customer registration counts to a site monitor. For example, the S/BC may have counters indicating the number of registrations by customers for predetermined intervals of time. In one embodiment, the customer registration counts may be provided to the site monitor in a predetermined schedule. In another embodiment, the site monitor may send requests for customer registration counts to the session border controllers based on its own schedule.

In step 430, method 400 receives a call. For example, the method may receive a Session Initiation Protocol (SIP) signaling message from a customer with a UE initiating a call towards a user of a PSTN endpoint.

In step 440, method 400 determines if throttling is enacted. For example, the S/BC may have been directed by a site monitor to enact throttling for re-homed customer PSTN calls handled by MGWs in other access offices. If throttling is enacted, the method proceeds to step 450. Otherwise, the method proceeds to step 490.

In step 450, method 400 determines if the received call is between a UE and a PSTN endpoint. For example, the method may process the Session Description Protocol (SDP) data in the received SIP signaling message to determine if the call is between a UE and a PSTN endpoint. If the call is between a UE and a PSTN endpoint, the method proceeds to step 460. Otherwise, the method proceeds to step 490.

In step 460, method 400 determines if the NPA code for the PSTN endpoint associated with the call is supported by a MGW located in the same access office. If the call is supported by a MGW located in the same access office, the method proceeds to step 490. Otherwise, the method proceeds to step 470.

In step 470, method 400 compares the one or more rules for throttling calls against a historical tracking data of similar calls. For example, the tracking data may indicate the limits for throttling calls have not been reached. For example, the throttling rule may allow 500 calls to be accepted every hour and the tracking data may show a current call count of only 20.

In step 480, method 400 determines if the call is to be rejected. For example, if the limits in accordance with the rules for throttling calls are reached, the call will be rejected. If the call is allowed to be setup, then the method proceeds to step 490. Otherwise, the method proceeds to step 485.

In step 485, method 400 rejects the call. For example, the method prevents the call from being setup. For example, the method may reply to the SIP signaling message with a SIP 503 message (service unavailable). The method may then proceed to step 495.

In step 490, method 400 continues processing the call. For example, the method may proceed with setting up of the call. For example, the users of the UE and PSTN endpoint may be able to converse once the call is allowed to be setup. The method then proceeds to step 495.

In step 495, method 400 updates local tracking counters for PSTN calls to/from other access offices. For example, if the call is accepted, the method may update counters by incrementing the number of calls. The method may then proceed to step 499 to end processing the current call. Alternatively, the method may then return to step 430. It should be noted that one or more steps of method 400 may be implemented in parallel and not in sequential order as shown. For example, steps 410 and 420 can be implemented in parallel and these steps can be implemented using independent processes or threads in most modern operating systems. As such, steps 410 and 420 will be executed in different time frame as well, e.g., in accordance to a predefined schedule or in response to a request at any given time.

In one embodiment, the above method 300 may store a list of NPA-NXX codes handled by media gateways in the same access office. The method may then enact throttling based on NPA-NXX codes instead of NPA codes. For example, the site monitor may enact throttling for NPA-NXX codes and notify S/BCs in the same office.

Those skilled in the art would realize that the media gateways, S/BCs, site monitors may be located in other types of offices. For example, the term "office" or "access office" refers to a logical grouping of equipment as discussed above.

For example, a regional office may house these network elements for various NPA codes or NPA-NXX codes. In addition, a PE and CE may be located within the same physical building. As such, the pairing of a CE and a PE and defines the relationship between the backbone and access portions of the NGN. Therefore, the above description is not intended to limit the implementation to a specific type of office or physical structure.

It should be noted that although not specifically specified, one or more steps of methods 300 and 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 and FIG. 4 that recite a determining operation or involve a decision, do not necessarily require that both branches of the determining operation be practiced. In other words, one of the branches of the determining operation can be deemed as an optional step.

Figure 5:
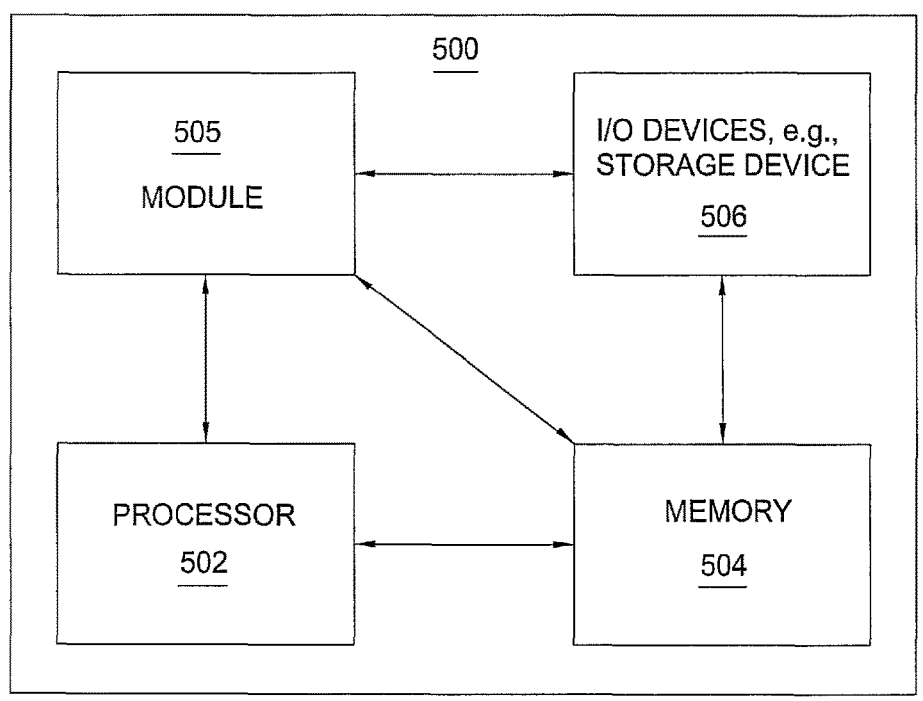
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for controlling call volume for an access office that serves as a protecting site for another access office, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 505 for controlling call volume for an access office that serves as a protecting site for another access office can be loaded into memory 504 and executed by processor 502 to implement the functions as discussed above. As such, the present method 505 for controlling call volume for an access office that serves as a protecting site for another access office (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for controlling a call volume in a network, the method comprising:
   determining, by a processor, a number of calls traversing a first access office and that utilize a media gateway in a second access office of the network have exceeded a threshold; and
   directing, by the processor, at least one session border controller located in the first access office to enact a throttling, wherein the throttling comprises refusing to setup an inter office call, wherein the inter office call comprises a call traversing different access offices, wherein the different access offices comprise the first access office and at least the second access office.

2. The method of claim 1, wherein the throttling implements a throttling rule that is based on a number of inter office calls that the network is able to support.

3. The method of claim 1, wherein the throttling is based on a number of inter office calls that are allowed at any given time.

4. The method of claim 1, wherein the inter office call is determined from a numbering plan area code.

5. The method of claim 1, wherein the network is a packet network.

6. The method of claim 1, further comprising:
   disabling the throttling when the number of calls traversing the first access office and that utilize the media gateway in the second access office of the network have fallen below the threshold.

7. The method of claim 1, wherein a number of inter office calls is determined from a numbering plan area code plus an exchange number.

8. A non-transitory computer-readable medium for storing instructions which, when executed by a processor, cause the processor to perform operations for controlling a call volume in a network, the operations comprising:
   determining a number of calls traversing a first access office and that utilize a media gateway in a second access office of the network have exceeded a threshold; and
   directing at least one session border controller located in the first access office to enact a throttling, wherein the throttling comprises refusing to setup an inter office call, wherein the inter office call comprises a call traversing different access offices, wherein the different access offices comprise the first access office and at least the second access office.

9. The non-transitory computer-readable medium of claim 8, wherein the throttling implements a throttling rule that is based on a number of inter office calls that the network is able to support.

10. The non-transitory computer-readable medium of claim 8, wherein the throttling is based on a number of inter office calls that are allowed at any given time.

11. The non-transitory computer-readable medium of claim 8, wherein the inter office call is determined from a numbering plan area code.

12. The non-transitory computer-readable medium of claim 8, wherein the network is a packet network.

13. The non-transitory computer-readable medium of claim 8, the operations further comprising:
   disabling the throttling when the number of calls traversing the first access office and that utilize the media gateway in the second access office of the network have fallen below the threshold.

14. The non-transitory computer-readable medium of claim 8, wherein a number of inter office calls is determined from a numbering plan area code plus an exchange number.

15. An apparatus for controlling a call volume in a network, the apparatus comprising:
   a processor; and
   a tangible computer-readable medium in communication with the processor storing instructions which, when executed by the processor, cause the processor to perform operations, the operations comprising:
      determining a number of calls traversing a first access office and that utilize a media gateway in a second access office of the network have exceeded a threshold; and
      directing at least one session border controller located in the first access office to enact a throttling, wherein the throttling comprises refusing to setup an inter office call, wherein the inter office call comprises a call traversing different access offices, wherein the different access offices comprise the first access office and at least the second access office.

16. The apparatus of claim 15, wherein the throttling implements a throttling rule that is based on a number of inter office calls that the network is able to support.

17. The apparatus of claim 15, wherein the throttling is based on a number of inter office calls that are allowed at any given time.

18. The apparatus of claim 15, wherein the inter office call is determined from a numbering plan area code.

19. The apparatus of claim 15, the operations further comprising:
   disabling the throttling when the number of calls traversing the first access office and that utilize the media gateway in the second access office of the network have fallen below the threshold.

20. The apparatus of claim 15, wherein a number of inter office calls is determined from a numbering plan area code plus an exchange number.

* * * * *